United States Patent
Su

(10) Patent No.: US 8,218,273 B2
(45) Date of Patent: Jul. 10, 2012

(54) DRIVING DEVICE WITH MOTOR CURRENT OVERLOAD PROTECTION ASSEMBLY

(75) Inventor: Xiao-Guang Su, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 509 days.

(21) Appl. No.: 12/541,120

(22) Filed: Aug. 13, 2009

(65) Prior Publication Data
US 2011/0001446 A1 Jan. 6, 2011

(30) Foreign Application Priority Data
Jul. 6, 2009 (CN) .......................... 2009 1 0304032

(51) Int. Cl.
*H02H 7/08* (2006.01)
*H02K 11/00* (2006.01)

(52) U.S. Cl. ........................................ 361/32; 310/68 C
(58) Field of Classification Search ................ 310/68 C; 318/475; 361/31–32
See application file for complete search history.

(56) References Cited

U.S. PATENT DOCUMENTS

| | | | | |
|---|---|---|---|---|
| 2,063,981 A | * | 12/1936 | Brunner | 361/32 |
| 2,073,286 A | * | 3/1937 | Raney | 337/117 |
| 2,844,778 A | * | 7/1958 | Seely et al. | 361/32 |

\* cited by examiner

*Primary Examiner* — Burton Mullins
(74) *Attorney, Agent, or Firm* — Altis Law Group, Inc.

(57) ABSTRACT

A driving device includes a motor, a rotatable shaft rotated by the motor, a driven member, a magnetic material spring, and a power source. The driven member sleeves on an end of the rotatable shaft, and includes an end surface with at least one latching groove defined thereon. The magnetic material spring sleeves the rotatable shaft, and includes a first end fixed to the rotatable shaft and an opposite second end capable of inserting into the latching groove of the driven member. The power source includes two electrodes. The motor and the spring are electrically connected in series between the two electrodes of the power source.

20 Claims, 3 Drawing Sheets

DRIVING DEVICE WITH MOTOR CURRENT OVERLOAD PROTECTION ASSEMBLY

BACKGROUND

1. Technical Field

The present disclosure relates to driving devices and, particularly, to a driving device with motor current overload protection assembly.

2. Description of Related Art

Motors are used for converting electrical energy into mechanical energy. When a motor is overloaded the current to the motor increases sharply and the coil temperature of the motor rises rapidly, due to this rapid rise in temperature, the coil may be damaged or even burn out.

What is needed, therefore, is a driving device with motor current overload protection assembly to overcome or at least mitigate the above-described problem.

BRIEF DESCRIPTION OF THE DRAWINGS

Many aspects of the present driving device can be better understood with reference to the accompanying drawings. The components in the drawings are not necessarily drawn to scale, the emphasis instead being placed upon clearly illustrating the principles of the present driving device. In the drawings, all the views are schematic.

DETAILED DESCRIPTION

Embodiments of the present disclosure will now be described in detail below, with reference to the accompanying drawings.

Figure 1:
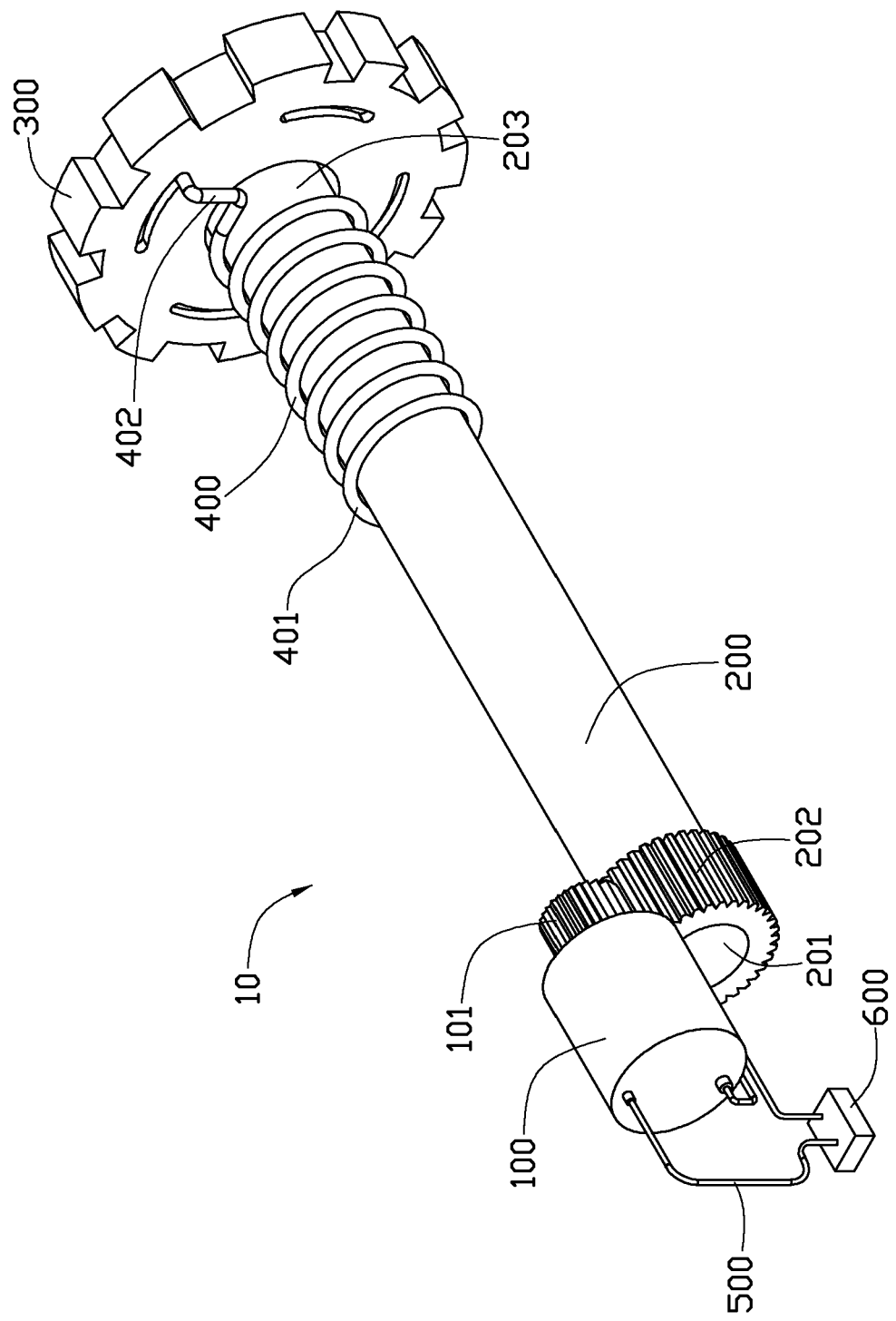
FIG. 1 is a schematic view of a driving device according to an exemplary embodiment.

Referring to the FIG. 1, a driving device 10 according to an exemplary embodiment, is shown. The driving device 10 includes a motor 100, a rotatable shaft 200, a driven member 300, a spring 400, a number of wires 500, and a power source 600.

The motor 100 is configured for rotating the rotatable shaft 200. In the present embodiment, the motor 100 includes a driving shaft 101 with a toothed circumferencial surface.

The rotatable shaft 200 defines a through hole 201 extending along the rotating axis of the rotatable shaft 200. The rotatable shaft 200 includes a first end 202 adjacent to the motor 100 and a second end 203 opposite to the first end 202. The first end 202 of the rotatable shaft 200 includes a toothed circumferencial surface for engaging with the toothed circumferencial surface of the driving shaft 101, thus, the rotatable shaft 200 is rotatable by the motor 100. The rotatable shaft 200 is made of insulating material.

Figure 2:
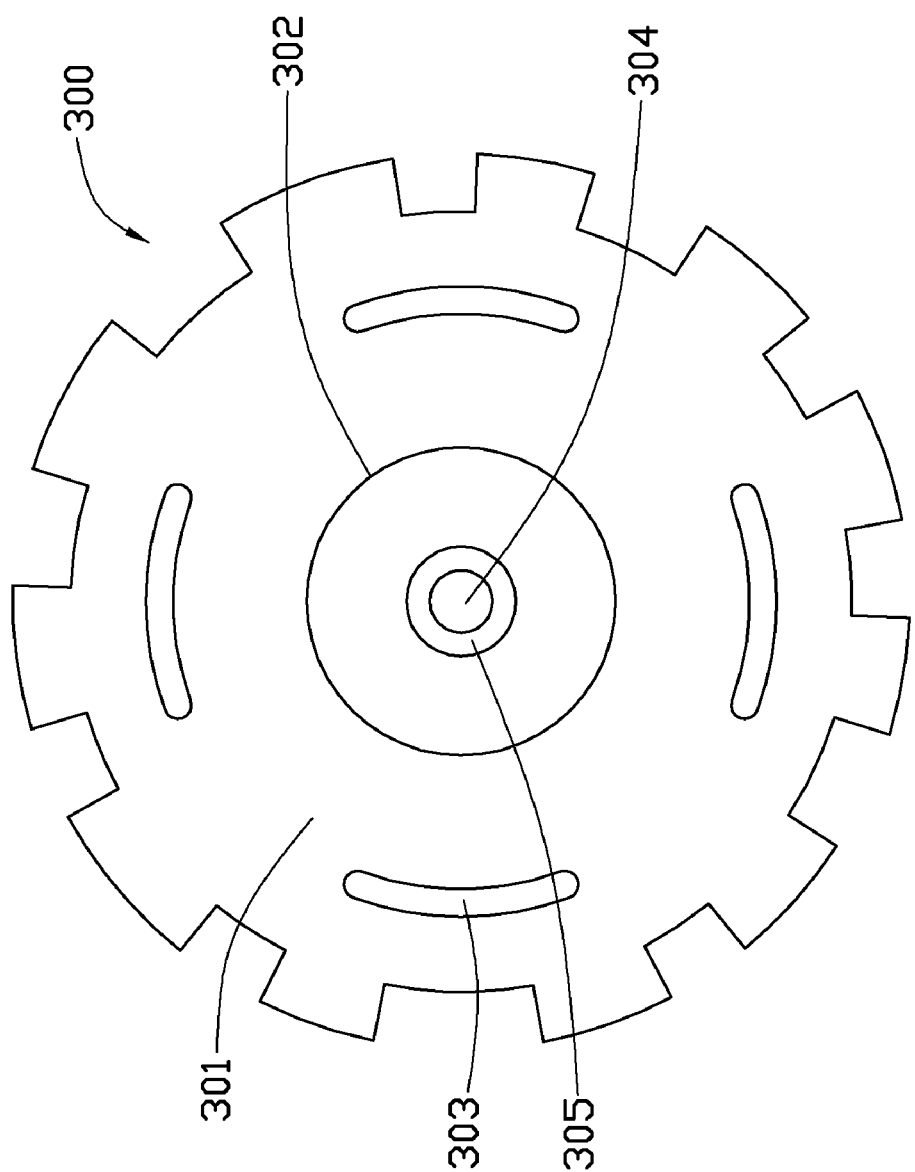
FIG. 2 is a schematic view of a driven member of the driving device of FIG. 1.

Further referring to FIG. 2, the driven member 300 can be a vehicle wheel, a driven gear and so on. In the present embodiment, the driven member 300 is a driven gear. The driven member 300 includes an end surface 301 facing the rotatable shaft 200. The end surface 301 defines a receiving hole 302 in the center and a number of latching grooves 303 surrounding the receiving hole 302. The second end 203 of the rotatable shaft 200 is inserted into the receiving hole 302. The second end 203 of the rotatable shaft 200 is unable to move out of the receiving hole 302 while the rotatable shaft 200 is rotating. The second end 203 of the rotatable shaft 200 is rotatable relative to the driven member 300. The driven member 300 further includes a protruding post 304 extending from the bottom wall of the receiving hole 302 and a ring-shaped electrical brush 305 surrounding the protruding post 304. The electrical brush 305 can conduct current to the protruding post 304 when rotating relative to the protruding post 304. In the present embodiment, the driven member 300 is made of electrically conductive material with the end surface 301 thereof coated with insulating material.

The spring 400 is electrically conductive and is made of magnetic material or alloy of the magnetic material. The magnetic material is a material which can be attracted to or repulsed by a magnet. The magnetic material includes iron, cobalt, nickel. The spring 400 is sleeved on the rotatable shaft 200. The spring 400 includes a first end 401 fixed to the rotatable shaft 200 and an opposite second end 402 inserted into the latching groove 303 of the driven member 300. Therefore, the spring 400 rotates following the rotation of the rotatable shaft 200, and the driven member 300 also rotates following the rotation of the rotatable shaft 200 and the spring 400 when the second end 402 of the spring 400 is inserted into the latching groove 303 of the driven member 300. In the present embodiment, the spring 400 further includes a ring-shaped electrical brush 403 surrounding the first end 401 of the spring 400.

Figure 3:
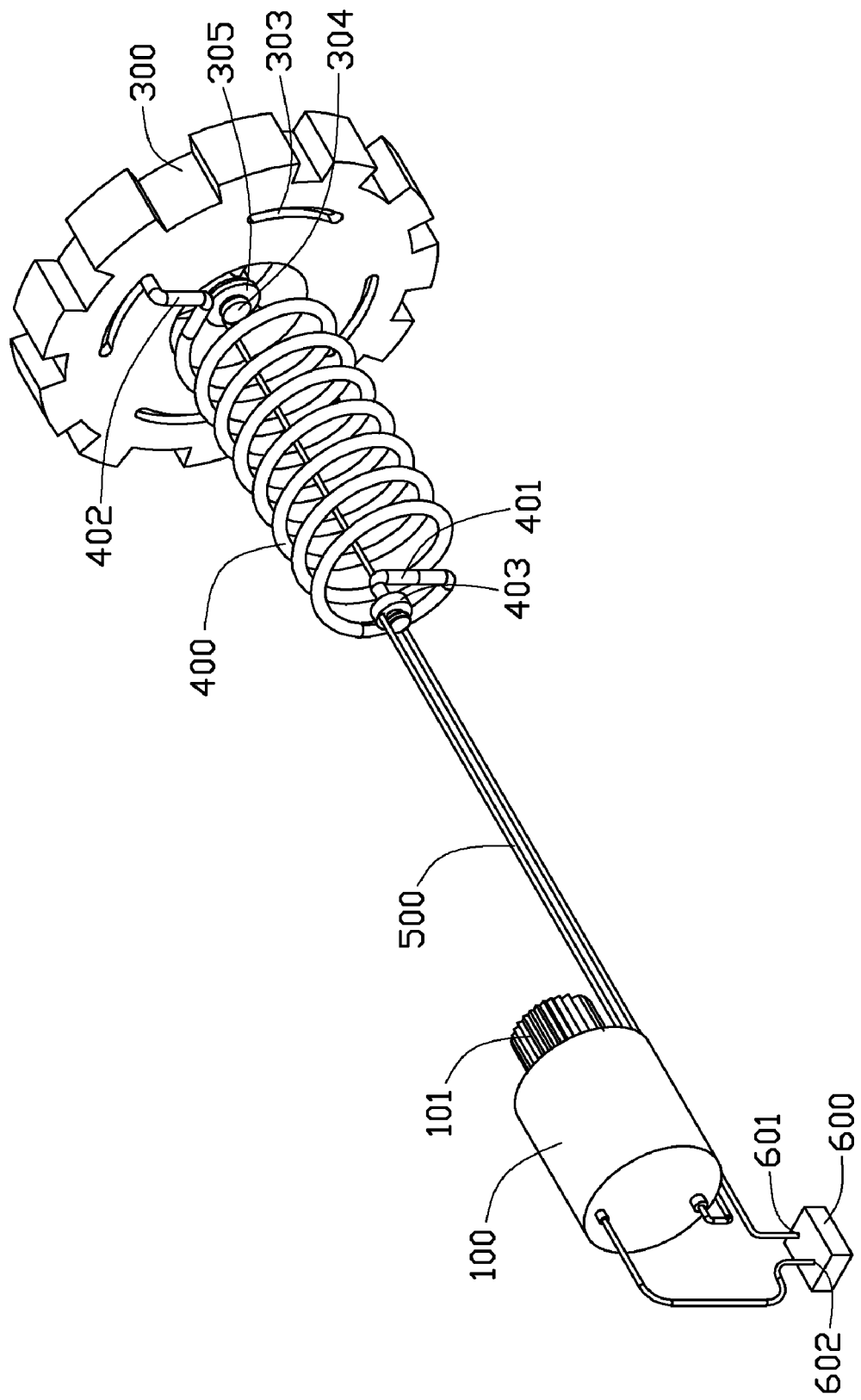
FIG. 3 shows the connection circuit of the driving device of FIG. 1.

Referring to FIG. 3, the power source 600 is used for providing power for the motor 100. The power source 600 includes a first electrode 601 and a second electrode 602. The driven member 300, the spring 400, and the motor 100 are connected in series between the first electrode 601 and the second electrode 602 of the power source 600 by wires 500. In the present embodiment, the wire 500 is fixed to the electrical brush 403 to connect the first end 401 of the spring 400 to one terminal of the motor 100, the other terminal of the motor 100 is connected to the second electrode 602 of the power source 600. Thus, the spring 400 will rotate independent of the wire 500. The second end 402 of the spring 400 is electrically connected to the first electrode 601 of the power source 600 via the driven member 300. The wire 500 connected between the driven member 300 and the first electrode 601 of the power source 600 has one end adjacent to the driven member 300 fixed to the electrical brush 305, thus, the driven member 300 will rotate independent of the wire 500.

Because the spring 400 is made of magnetic material, the spring 400 will contract when the current flowing through the spring 400 increase. The current flowing through the spring 400 is the same current flowing through the motor 100. Therefore, when the current flowing through the motor 100 exceeds a predetermined value, the second end 402 of the spring 400 will withdraw out of the latching groove 303 of the driven member 300 due to the spring 400 contracting. Thus, the electrical connection between the second end 402 of the spring 400 and the driven member 300 will be open, as a result, the motor 100 will be deactivate (powered off) and protected from current overload. The predetermined value is determined by the elasticity of the spring 400 and the length of the second end 402 inserted into the latching groove 303.

While certain embodiments have been described and exemplified above, various other embodiments will be apparent to those skilled in the art from the foregoing disclosure. The invention is not limited to the particular embodiments described and exemplified, and the embodiments are capable of considerable variation and modification without departure from the scope and spirit of the appended claims.

What is claimed is:

1. A driving device comprising:
   a motor;

a rotatable shaft rotated by the motor;

a driven member sleeved on an end of the rotatable shaft, the driven member comprises an end surface with at least one latching groove defined thereon;

a magnetic material spring sleeved on the rotatable shaft, the spring comprises a first end fixed to the rotatable shaft and an opposite second end capable of inserting into the at least one latching groove of the driven member, and a power source with two electrodes for providing power for the motor, wherein the motor and the spring are electrically connected in series between the two electrodes of the power source.

2. The driving device of claim 1, wherein the motor comprises a driving shaft with a toothed circumferencial surface, and an end of the rotatable shaft away from the driven member comprises a toothed circumferencial surface for engaging with the toothed circumferencial surface of the driving shaft.

3. The driving device of claim 1, wherein the driven member is a wheel or a driven gear.

4. The driving device of claim 1, wherein the end surface of the driven member defines a receiving hole in the center thereof for sleeving the rotatable shaft.

5. The driving device of claim 4, wherein the end surface of the driven member defines a plurality of latching grooves surrounding the receiving hole.

6. The driving device of claim 5, wherein the driven member is made of electrically conductive material, and the second end of the spring is electrically connected to an electrode of the power source via the driven member.

7. The driving device of claim 6, wherein the end surface of the driven member is coated with insulating material.

8. The driving device of claim 6, wherein the driven member further comprises a protruding post extending from the bottom wall of the receiving hole and a conductive ring surrounding the protruding post for connecting to the electrode of the power source.

9. The driving device of claim 6, wherein the rotatable shaft is made of insulating material.

10. The driving device of claim 1, wherein the magnetic material comprises iron, cobalt, and nickel.

11. A motor current overload protection assembly comprising:

a rotatable shaft rotated by the motor;

a driven member sleeved on an end of the rotatable shaft, the driven member comprises an end surface with at least one latching groove defined thereon; and a magnetic material spring sleeved on the rotatable shaft, the spring comprises a first end fixed to the rotatable shaft and an opposite second end capable of inserting into the at least one latching groove of the driven member, wherein the motor and the spring are electrically connected in series between two electrodes of a power source.

12. The motor current overload protection assembly of claim 11, wherein the motor comprises a driving shaft with a toothed circumferencial surface, and an end of the rotatable shaft away from the driven member comprises a toothed circumferencial surface for engaging with the toothed circumferencial surface of the driving shaft.

13. The motor current overload protection assembly of claim 11, wherein the driven member is a wheel or a driven gear.

14. The motor current overload protection assembly of claim 11, wherein the end surface of the driven member defines a receiving hole in the center thereof for sleeving the rotatable shaft.

15. The motor current overload protection assembly of claim 14, wherein the end surface of the driven member defines a plurality of latching grooves surrounding the receiving hole.

16. The motor current overload protection assembly of claim 15, wherein the driven member is made of electrically conductive material, and the second end of the spring is electrically connected to an electrode of the power source via the driven member.

17. The motor current overload protection assembly of claim 16, wherein the end surface of the driven member is coated with insulating material.

18. The motor current overload protection assembly of claim 16, wherein the driven member further comprises a protruding post extending from the bottom wall of the receiving hole and a conductive ring surrounding the protruding post for connecting to the electrode of the power source.

19. The motor current overload protection assembly of claim 16, wherein the rotatable shaft is made of insulating material.

20. The motor current overload protection assembly of claim 11, wherein the magnetic material comprises iron, cobalt, and nickel.

* * * * *